US006322346B1

(12) United States Patent
Hoffmann et al.

(10) Patent No.: US 6,322,346 B1
(45) Date of Patent: Nov. 27, 2001

(54) DEVICE FOR CONTINUOUS PRODUCTION OF PLATE-SHAPED PRODUCTS

(75) Inventors: Peter Hoffmann, Springe; Ulrich Haupt, Wennigsen, both of (DE)

(73) Assignee: Valmet Panelboard GmbH, Hannover (DE)

( * ) Notice: Subject to any disclaimer, the term of this patent is extended or adjusted under 35 U.S.C. 154(b) by 0 days.

(21) Appl. No.: 09/381,054

(22) PCT Filed: Mar. 3, 1998

(86) PCT No.: PCT/EP98/01185

§ 371 Date: Dec. 23, 1999

§ 102(e) Date: Dec. 23, 1999

(87) PCT Pub. No.: WO98/41389

PCT Pub. Date: Sep. 24, 1998

(30) Foreign Application Priority Data

Mar. 14, 1997 (DE) ............................................. 197 10 723

(51) Int. Cl.[7] ..................................................... B29C 43/48

(52) U.S. Cl. ........................................ 425/371; 156/583.5

(58) Field of Search ......................... 156/583.5; 425/371; 100/151, 154

(56) References Cited

U.S. PATENT DOCUMENTS

| | | | | |
|---|---|---|---|---|
| 3,462,795 | * | 8/1969 | Hermanns | 425/371 |
| 4,105,387 | | 8/1978 | Ahrweiler . | |
| 4,573,404 | * | 3/1986 | Held | 156/583.5 |
| 4,850,848 | | 7/1989 | Greten . | |
| 5,395,576 | | 3/1995 | Blauhut . | |
| 5,827,460 | * | 10/1998 | Brentrup et al. | 425/371 |

FOREIGN PATENT DOCUMENTS

| | | |
|---|---|---|
| 2923036A1 | 12/1980 | (DE) . |
| 3928847A1 | 3/1991 | (DE) . |
| 29622385U1 | 6/1997 | (DE) . |
| 0484735A1 | 5/1992 | (EP) . |
| 0667222A2 | 8/1995 | (EP) . |

* cited by examiner

*Primary Examiner*—Michael A. Tolin
(74) *Attorney, Agent, or Firm*—Townsend and Townsend and Crew LLP

(57) ABSTRACT

The invention relates to a device for the continuous production of plate-shaped products, comprising two endless strips which are positioned one above the other and can be driven. A working gap is formed between the sides of said endless strips, said sides being adjacent to one another and each being conveyed via a support surface. The starting material for processing is conveyed through said working gap which is bordered on each side by an accompanying strip. Said accompanying strip is situated along said working gap between the two endless strips and moves with them, consisting of a flexible sealing strip which has a friction surface on at least one face, said face facing towards an endless strip. Said friction surface increases the static friction between the flexible sealing strip and the endless strip.

22 Claims, 2 Drawing Sheets

DEVICE FOR CONTINUOUS PRODUCTION OF PLATE-SHAPED PRODUCTS

BACKGROUND OF THE INVENTION

1. Field of the Invention

The invention relates to a device for continuous production of plate-shaped products.

2. Description of the Prior Art

In the compression of materials which achieve the liquid phase or are softened during the compression process, accompanying strips are required, through which a lateral flowing away of the product is prevented. A lateral flowing away of the product would namely mean that the counter pressure drops in the product edge region and that an isobaric compression pressure no longer prevails there. A pressure decrease would set in toward the edge which further favors the flow process. A material flow of this kind would moreover lead to the respective design structure being disturbed in the product edge region and to this edge region thus becoming unusable.

A device for continuous production of plate-shaped products, which has co-moving strips of elastic material for the lateral closing off of the working gap of the described device, is known from EP 0484 735 A1. These strips are taken along via frictional locking and can contain reinforcement inlays. In practice, however, the resulting frictional locking is not sufficient in order to ensure the required exact positioning of the strips, in particular when a high internal pressure arises in the pressing gap as a result of the materials to be compressed.

A device for continuous production of plate-shaped products having accompanying strips is known from DE-A-29 23 036. In order to ensure that the accompanying strips withstand the internal pressure of the product and cannot be pressed away outwardly, the lower endless strip is provided with holders in this known device which are formed for example by bolts which are welded on or adhesively bonded on. The use of a holder of this kind is not only complicated and expensive, but it also brings about in particular the disadvantage that a width adjustment which may be required is not possible without further ado.

SUMMARY OF THE INVENTION

The object of the invention is to create an apparatus of the initially named kind in which, in a particularly simple and correspondingly economical manner, on the one hand the width of the working gap and thus of the product can be adjusted without problem through a corresponding displacement of the accompanying strips and on the other hand it is ensured that the accompanying strips exactly maintain their respective position during operation.

The object of the invention is satisfied in that the sealing strip has at least at one broad side which faces an endless strip a frictional surface which increases the adhesive friction between the flexible sealing strip and the endless strip and which is formed by a frictional layer which is provided with an abrasion means.

As a result of the increased adhesive friction which is achieved through the frictional surface, more complicated and expensive holders or the like can be dispensed with. It is nevertheless ensured that the accompanying strips maintain their respective position during operation. In addition the width of the working gap and thus the width of the product can where appropriate be adjusted without problem through a corresponding displacement of the accompanying strips. Through the accompanying strips, which are to be matched in their thickness to the material thickness, finally, any lateral flowing away of the starting material is prevented, so that an orientation-free structure is obtained for the respective product over the entire width region. The frictional surface is preferably formed by a frictional layer which is applied to the respective broad side of the sealing strip.

In an embodiment which is preferred in practice the frictional surface, when viewed transversely to the strip travel direction, ends at a distance from the gap-side edge of the flexible sealing strip, with the region between the frictional surface and the relevant endless strip being sealed off in the direction towards the working gap through the frictional-surface-less edge region of the flexible sealing strip at least under the action of a pressing force which is applied via the support surfaces. Through this it is excluded that liquid or softened material enters into the region between the frictional surface and the relevant endless strip, so that an ideal adhesion action is always provided for.

For achieving an ideal seal the flexible sealing strip may be matched at least at one broad side in the frictional-surface-less edge region with a sealing lip which extends in the strip longitudinal direction.

In an embodiment which is preferred in practice the flexible sealing strip has a frictional surface on only one broad side. In this case it is advantageous when the flexible sealing strip is provided with a sealing lip at least at the oppositely situated broad side.

In principle however the use of a flexible sealing strip which has at both broad sides in each case a sealing lip which extends in the strip longitudinal direction is also possible.

The frictional layer advantageously comprises a temperature resistant carrier layer which is connected to the flexible sealing strip and onto which the abrasion means is applied. This carrier layer can expediently be formed by a temperature resistant plastic mesh. The frictional layer thus also withstands higher compression pressures and correspondingly higher temperatures.

The abrasion means can for example contain sand material and/or the like. Alternatively or additionally, it can also contain corundum. In this case corundum which is bound in phenolic resin is preferably used.

The frictional layer is preferably adhesively bonded to the flexible sealing strip. A further required property of this flexible sealing strip is its temperature resistance and temperature change strength. The temperature resistance should reach to about 200° C. and the temperature change strength from about 200° C. to about 30° C.

The flexible sealing strip preferably consists of silicone rubber, polytetrafluorethylene (TFE) and/or the like, through which among other things it is achieved that the relevant accompanying strip can be released without problem from the product, which (is) for example a plastic flooring (or the like).

In order to ensure a permanent bonding between this frictional layer and the flexible sealing strip under the respective compression conditions at varying pressure and at varying temperature, this frictional layer is expediently adhesively bonded to the flexible sealing strip by a two component adhesive bonder, in particular a two component silicone rubber adhesive bonder.

As protection against a loosening of the abrasion means an adhesive bonder edge is expediently provided at the gap-side edge of the frictional layer.

Since the flexible sealing strip is as a rule subjected to a tensile stress, it is advantageous if it contains a reinforcement, which can for example consist of a glass fiber mesh. For protecting this reinforcement the gap-side edge of the flexible sealing strip can be provided with a covering which is preferably produced by a silicone rubber paste.

In an embodiment which is preferred in practice two endless accompanying strips are provided which in each case encircle the lower endless strip. In this it is advantageous if the upper side of the lower endless strip protrudes outwardly or is drawn forward beyond the upper endless strip in the direction opposite to the strip travel direction. Through this the starting material which is applied to this side experiences a definite lateral bounding.

The flexible sealing strip of a respective accompanying strip preferably has a frictional surface only on its broad side which faces the lower endless strip.

DETAILED DESCRIPTION OF SPECIFIC EXEMPLARY EMBODIMENTS

Figure 1:
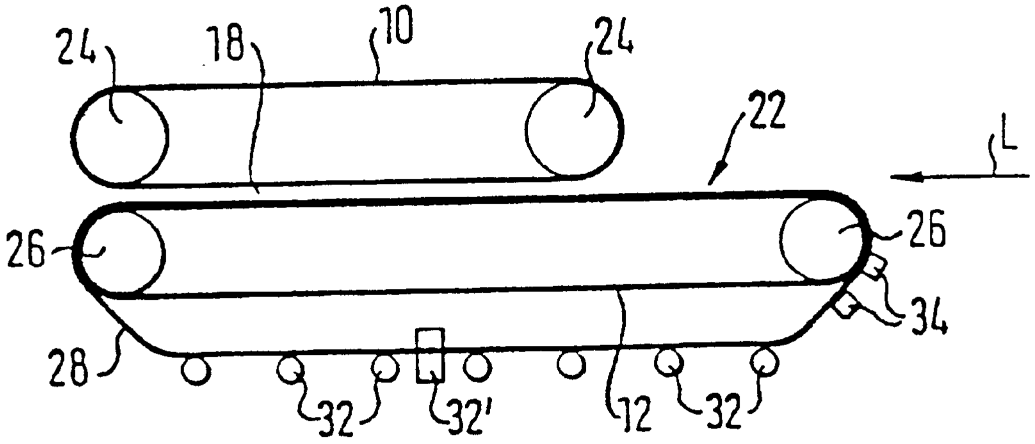
FIG. 1 is a purely schematic side view of a device for continuous production of plate-shaped products.

FIG. 1 shows in a purely schematic side view a device for continuous production of plate-shaped products.

Figure 2:
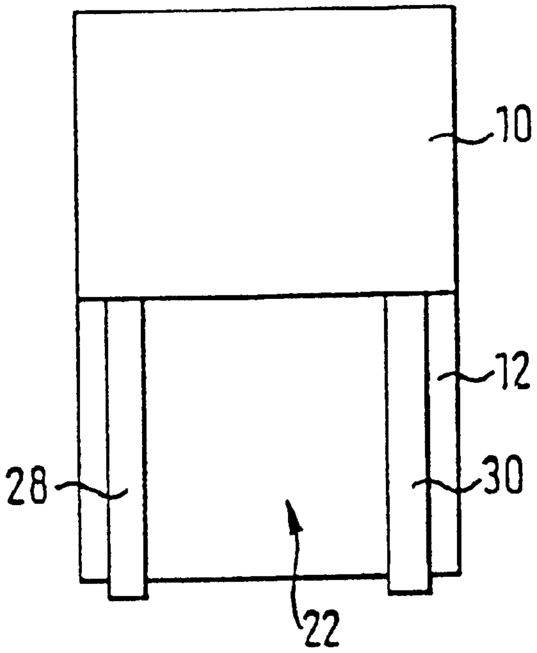
FIG. 2 is a schematic plan view of the input region of the device in accordance with FIG. 1, with a part of the lower endless strip, which is encircled by the accompanying strips, being broken away.
Figure 3:
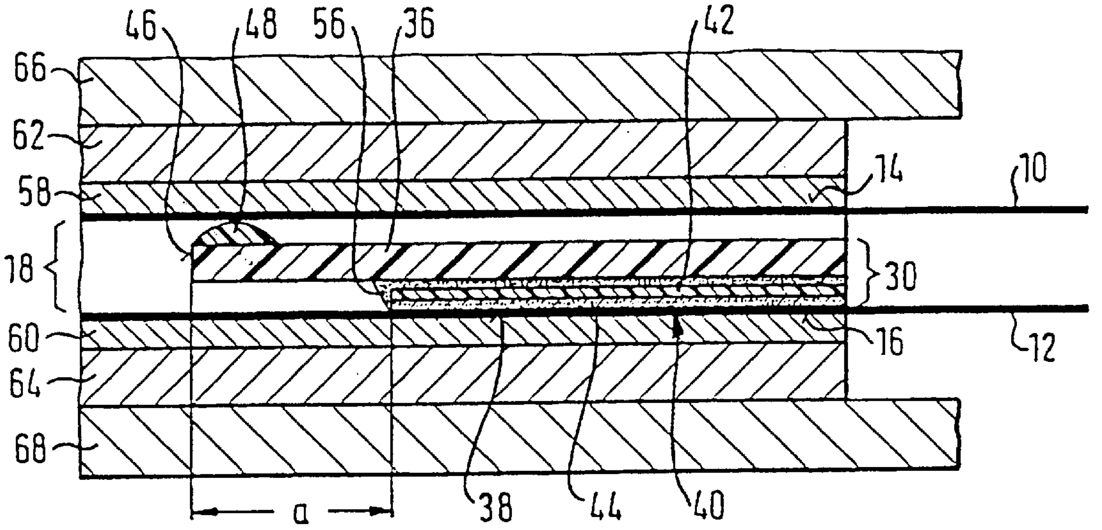
FIG. 3 is a schematic cross-section through a part of the unstressed working gap of the device in accordance with FIG. 1.
Figure 4:
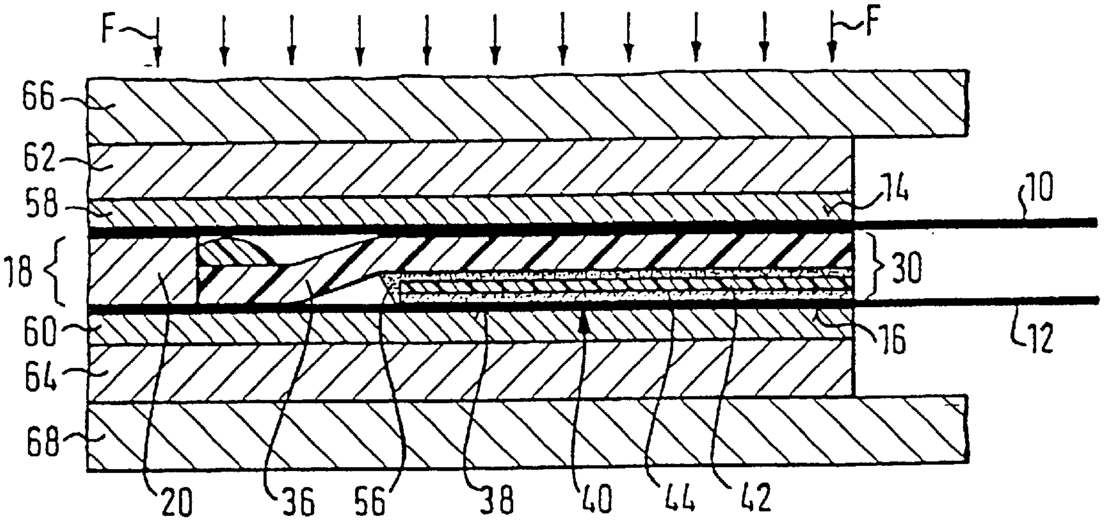
FIG. 4 is a schematic cross-section comparable to FIG. 3 through the loaded working gap.

As can be recognized with reference to FIGS. 2 to 4, the device comprises two endless strips 10, 12 which are positioned one above the other and can be driven via support surfaces 14, 16. A working gap 18 is defined between mutually adjacent sides of the endless strips. A starting material 20 for processing, which is first deposited onto the upper side of the lower endless strip 12 in the input region 22, is conveyed in the strip travel direction L through working gap 18.

The endless strips 10, 12, which for example consist of steel, are in each case guided around two rollers 24 and 26 respectively which are arranged with a spacing with respect to one another.

The working gap 18 is bounded on each side by an accompanying strip 28, 30 (cf. in particular FIG. 2), of which only one can be recognized in each case in FIGS. 1, 3 and 4.

Two accompanying strips 28, 30 in each case encircle the lower endless strip 12. The two accompanying strips are situated with their upper side along the working gap 18 between the two endless strips 10, 12 and move with the two endless strips. With reference to the exemplary embodiment which is illustrated in FIGS. 1 and 2 it can be recognized that the upper side of the lower endless strip 12 protrudes outwardly beyond or, respectively, is drawn forward with respect to the upper endless strip 10 in the direction opposite to the strip travel direction L. Through this the starting material which is deposited on this side experiences a definite lateral bounding.

As can be recognized with reference to FIG. 1, the lower side of the accompanying strips 28, 30 is guided horizontally and vertically via guide rollers 32, 32'. In the region of the input-side drum or roller 26 a guide 34 is provided in order to ensure that the respective accompanying strip 28, 30 runs onto the roller in the desired position.

Each of the two accompanying strips 28, 30 consists of a flexible sealing strip 36, which consists in the present case of silicone rubber.

The sealing strip 36 has at its broad side which faces the lower endless strip 12 a frictional surface 38 which increases the adhesive friction between the flexible sealing strip 36 and the endless strip 12 and which is formed by a frictional layer 40 which is applied to the relevant broad side of the sealing strip 36. This frictional layer 40 comprises a temperature resistant carrier layer 42 which is bonded to the flexible sealing strip 36 and onto which an abrasion means 44 is applied.

Viewed transversely to the strip travel direction L, the frictional surface 38 which is formed by the frictional layer 40 ends at a distance a from the ga-pside edge 46 of the flexible sealing strip 36. In the frictional-surface-less edge region the flexible sealing strip 36 is provided on its broad side which faces away from the frictional surface 38 with a sealing lip 48 which extends in the strip travel direction L.

As can be recognized with reference to FIG. 4, the region between the frictional surface 38 and the lower endless strip 12 is sealed off in the direction towards working gap 18 through the frictional-surface-less edge region of the flexible sealing strip 36 under the action of a compression force F which is applied via the support surfaces 14, 16.

Figure 5:
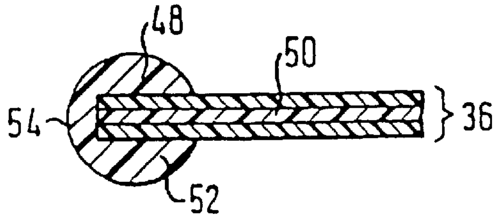
FIG. 5 illustrates a further embodiment of an accompanying strip.

In FIG. 5 a further embodiment of an accompanying strip is shown, the flexible sealing strip 36 of which contains a reinforcement 50 which consists in the present case of a glass fiber mesh. In addition in this case the flexible sealing strip 36 is provided on both broad sides in each case with a sealing lip 48 and 52 respectively which extends in the strip longitudinal direction L. In addition the gap-side edge of the flexible sealing strip 36 is provided with a covering 54 for protecting the reinforcement 50 which can be produced by a silicone rubber paste.

The carrier layer 42 of the frictional layer 40 is formed by a temperature resistant plastic mesh.

The abrasion means 44, which is formed in particular by a granulation, can contain sand material and/or the like. Additionally or alternatively, it can contain corundum, with in particular corundum which is bound in phenolic resin being used.

The frictional layer 40 is adhesively bonded onto the flexible sealing strip 36, which consists of silicone rubber, through a two component silicone rubber adhesive bonder.

In the exemplary embodiment which is illustrated in FIGS. 3 and 4 an adhesive bonder edge 56 is provided at the gap-side edge of the frictional layer 40 as a protection against a loosening of the abrasion means 44.

In accordance with FIGS. 3 and 4 the two support surfaces 14, 16 are in each case formed by a preferably oil lubricated sliding layer 58 and 60 respectively which is arranged on the inner side of a respective counter-bearing 62, 64 which outwardly borders on an upper pressing plate 66 or a lower pressing plate 68 respectively which can be stressed by the compression force F.

Under the action of the compression force F the frictional-surface-less edge region of the flexible sealing strip 36 of a respective accompanying strip 28, 30 is deformed in such a manner that no softened material particles can depart from the working gap 18 between the frictional surface 38 and the upper side of the lower endless strip 12. This ensures an unobjectionable action of the frictional layer 40 and a reliable functioning of the respective accompanying strip 28, 30 so that the thickness relationship of the product which is obtained from the starting material 20 and the accompanying strip 28, 30 always remains constant.

The thickness of a respective accompanying strip 28, 30 is matched to the material thickness so that any flow process in the product is prevented.

Through the increased adhesive friction it is ensured that the frictional force is greater than the compression force of the product at least during the operation, so that the accompanying strips maintain their respective position.

The accompanying strips can be released without problem from the product, which for example can be a plastic flooring. As a result of the careful release a damage to the end edge of the product is excluded.

The accompanying strips are distinguished by a long lifetime. In particular as a result of the reinforcement they can also withstand the higher tensile stresses which arise when they are pulled through the press.

The sealing in the direction towards the working gap takes place in such a manner that no liquid product can enter into the region between the frictional layer and the lower endless strip. An ideal adhesive action is thus always ensured. In addition the thickness ratio of product/accompanying strip is held within the predetermined range. Since the basis material of the frictional layer consists of a temperature resistant plastic mesh, this coating also withstands higher temperatures, which can reach values of for example 200° C. in the core region of a press. In addition a reliable bonding between the frictional layer and the flexible sealing strip is provided for.

The accompanying strips in accordance with the invention are suitable in particular for all double strip presses in which an areal pressing takes place in order for example to manufacture floor covering swaths from a thermoplastic plastic in the form of particles such as shreds, crumbs, sections, pieces, chips and/or the like. The accompanying strips can in particular be used in a press such as is described in DE-PS 37 12 634.

What is claimed is:

1. A device for continuous production of plate-shaped products from a starting material, the starting material including top and bottom surfaces, and first and second sides, the device comprising:

first and second endless pressing strips for contacting the starting material on the top and bottom surfaces, respectively, the first endless pressing strip positioned above the second endless pressing strip to define a working gap therebetween, wherein each of the first and second endless pressing strips may be driven to move the starting material in a strip travel direction;

a first support surface in contact with the first endless pressing strip and a second support surface in contact with the second endless pressing strip; and first and second sealing strips for contacting the first and second sides of the starting material, respectively, wherein the first and second sealing strips are positioned between the first and second endless pressing strips, and wherein the first and second sealing strips are capable of moving with the first and second endless pressing strips;

wherein the first and second sealing strips comprise a flexible sealing strip material and the sealing strip material comprises a base having a first broad side, a second broad side, and a frictional layer on the second broad side for providing friction between the sealing strip material and an endless strip, wherein the frictional layer is provided with an abrasion means.

2. A device in accordance with claim 1 wherein the frictional surface, when viewed transversely to the strip travel direction, ends at a distance from a gap-side edge of the flexible sealing strip, and a region between the frictional surface and a corresponding endless strip is sealed off in a direction towards the working gap through a frictional surface-less edge region of the flexible sealing strip at least under action of a pressing force that is applied via the first and second support surfaces.

3. A device in accordance with claim 2 wherein each flexible sealing strip is provided in the frictional-surface-less edge region at least at one broad side with a sealing lip that extends in a strip longitudinal direction.

4. A device in accordance with claim 3 wherein each flexible sealing strip has a frictional surface only on one broad side and is provided with a sealing lip at least on an oppositely situated broad side.

5. A device in accordance with claim 4 wherein each flexible sealing strip is provided, at both broad sides, with a sealing lip that extends in the strip longitudinal direction.

6. A device in accordance with claim 2 wherein each flexible sealing strip contains a reinforcement.

7. A device in accordance with claim 6 wherein the reinforcement comprises a glass fiber mesh.

8. A device in accordance with claim 6 wherein the gap-side edge of each flexible sealing strip is provided with a covering.

9. A device in accordance with claim 8 wherein the covering is produced by a silicone rubber paste for protecting the reinforcement.

10. A device in accordance with claim 1 wherein the frictional layer comprises a temperature resistant carrier layer that is connected to the flexible sealing strip and onto which the abrasion means is applied.

11. A device in accordance with claim 10 wherein the carrier layer is formed by a temperature resistant plastic mesh.

12. A device in accordance with claim 1 wherein the abrasion means contains sand material.

13. A device in accordance with claim 1 wherein the abrasion means contains corundum.

14. A device in accordance with claim 13 wherein the abrasion means contains corundum that is bound in phenolic resin.

15. A device in accordance with claim 1 wherein the frictional layer is adhesively bonded to the flexible sealing strip.

16. A device in accordance with claim 1 wherein each flexible sealing strip comprises at least one of silicone rubber and polytetrafluorethylene.

17. A device in accordance with claim 1 wherein each frictional layer is adhesively bonded onto the corresponding flexible sealing strip through a two component adhesive bonder.

18. A device in accordance with claim 17 wherein the two component adhesive bonder comprises a two component silicone rubber adhesive bonder.

19. A device in accordance with claim 17 wherein the adhesive bonder is provided at a gap-side edge of each frictional layer.

20. A device in accordance with claim 1 wherein the first and second sealing strips encircle the second endless pressing strip.

21. A device in accordance with claim 20 wherein an upper side of the second endless pressing strip protrudes outwardly beyond the first endless pressing strip in a direction opposite to the strip travel direction.

22. A device in accordance with claim 1 wherein the second broad side of each flexible sealing strip faces towards the second endless pressing strip, and each flexible sealing strip has a frictional surface only on the second broad side.

* * * * *